R. ALLEN.
PISTON.
APPLICATION FILED DEC. 30, 1914.

1,188,876.

Patented June 27, 1916.
4 SHEETS—SHEET 2.

Witnesses:

Inventor:
Robert Allen
by P. Singer Atty.

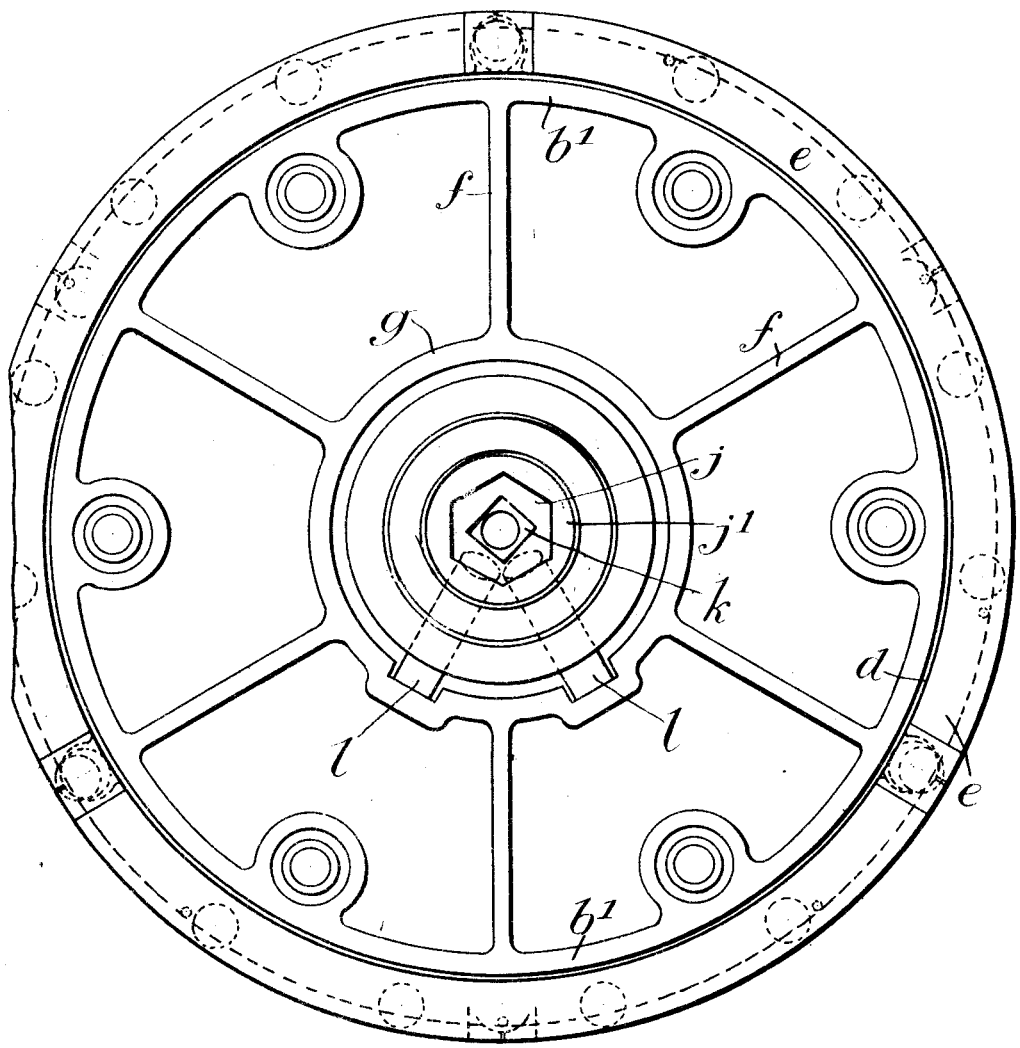

R. ALLEN.
PISTON.
APPLICATION FILED DEC. 30, 1914.

1,188,876.

Patented June 27, 1916.
4 SHEETS—SHEET 4.

UNITED STATES PATENT OFFICE.

ROBERT ALLEN, OF CAVERSHAM, ENGLAND.

PISTON.

1,188,876.  Specification of Letters Patent.  Patented June 27, 1916.

Application filed December 30, 1914. Serial No. 879,731.

*To all whom it may concern:*

Be it known that I, ROBERT ALLEN, a subject of the King of Great Britain and Ireland, residing at Lynwood, Kidmore Road, Caversham, Oxfordshire, England, have invented certain new and useful Improvements in Pistons, of which the following is a specification.

This invention relates to pistons which are provided with adjustable centering rings for taking up wear and has for one of its objects to provide improved means for adjusting the centering ring in relation to the piston head, in order to center the piston head and rod.

Another object is to provide a piston of improved construction.

According to this invention a relative movement of the centering ring and piston head transversely to the axis for the purpose of centering the piston or compensating for uneven wear of the piston which occurs in horizontal cylinders is effected by a wedging action applied at or near the center of the piston head and transmitted to the centering ring by suitable means such as radially sliding rods or struts. The centering ring may form the main body portion of the piston and carry the packing rings or be separate from the packing.

In one form of construction as applied to a box section piston constructed with a hollow main body portion or packing ring carrier and movable end plates between which a collar on the piston rod is clamped, the end of the rod is bored axially and screw threaded to receive a conical plug and lock ring provided with suitable openings for the reception of adjusting keys. The plug is arranged to act on a rod or rods mounted to slide in radial openings in the head of the piston rod, and bearing against the packing ring carrier which in this case forms the centering ring. This ring also forms the hollow main body of the piston and may be cast in one piece with an inner ring or collar which surrounds the collar on the piston rod and is connected with the tread portion of the body by radial webs which form compression stays for the hollow piston head. In the latter case the adjusting rods bear against the inner ring member, but when this is not provided they are extended to act directly on the tread portion.

The invention is hereinafter described with reference to the accompanying drawings in which:—

Figure 1:
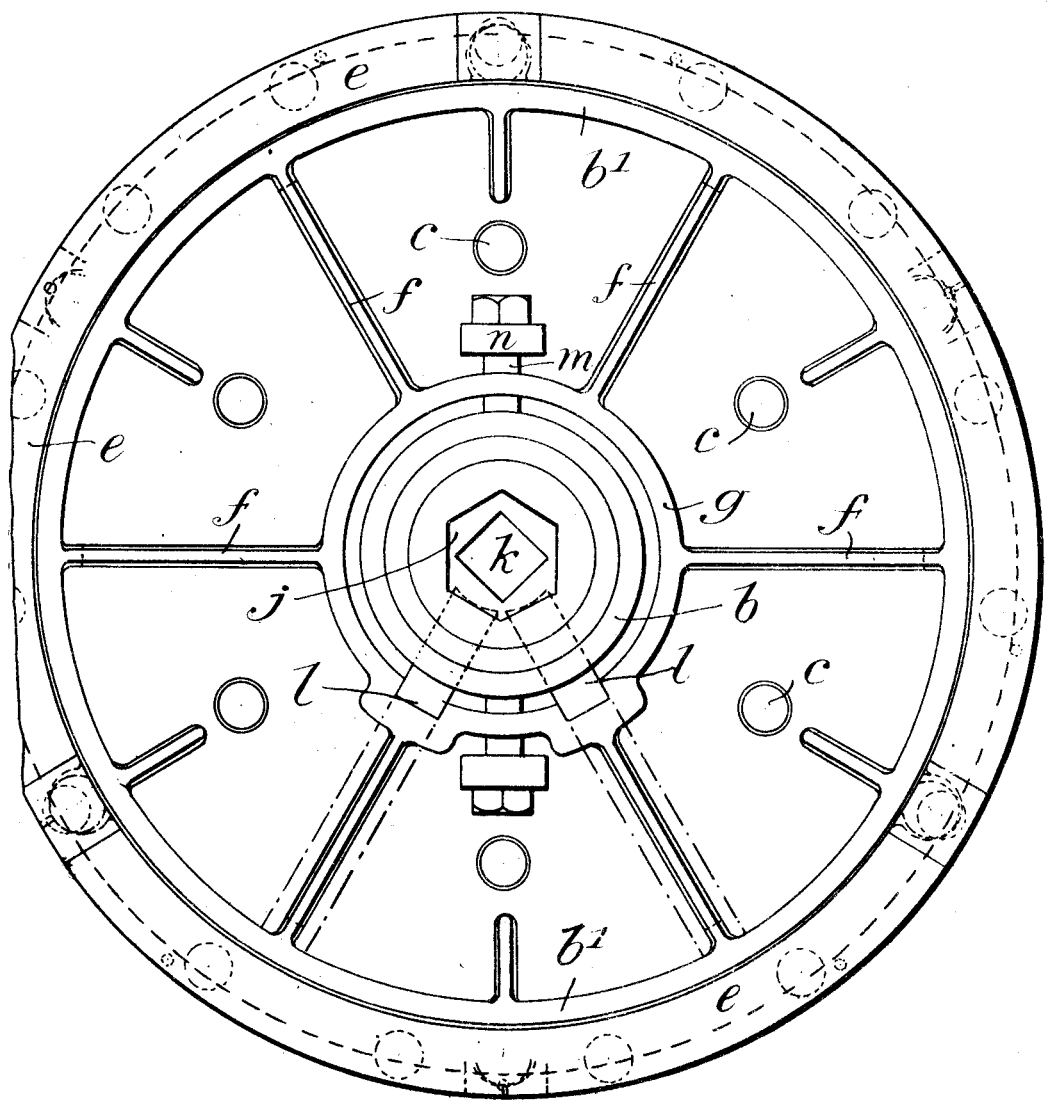
Figure 2:
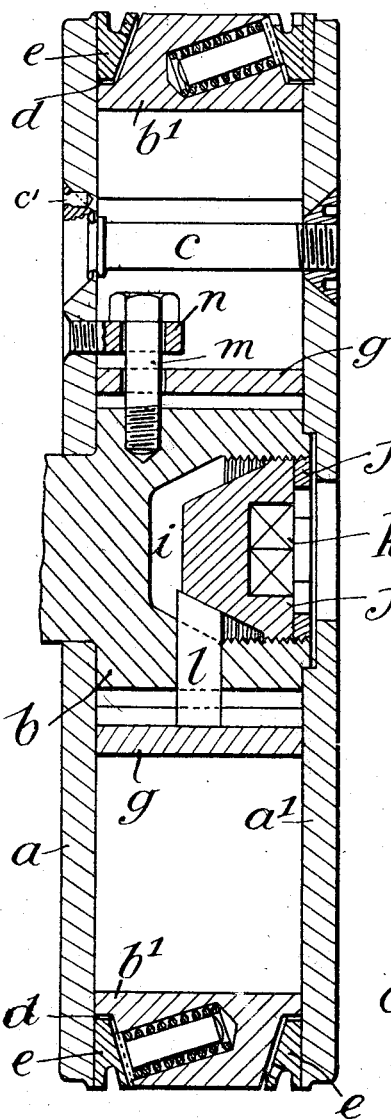
Figure 5:
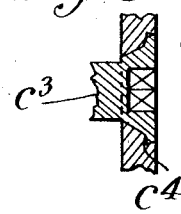
Figure 4:
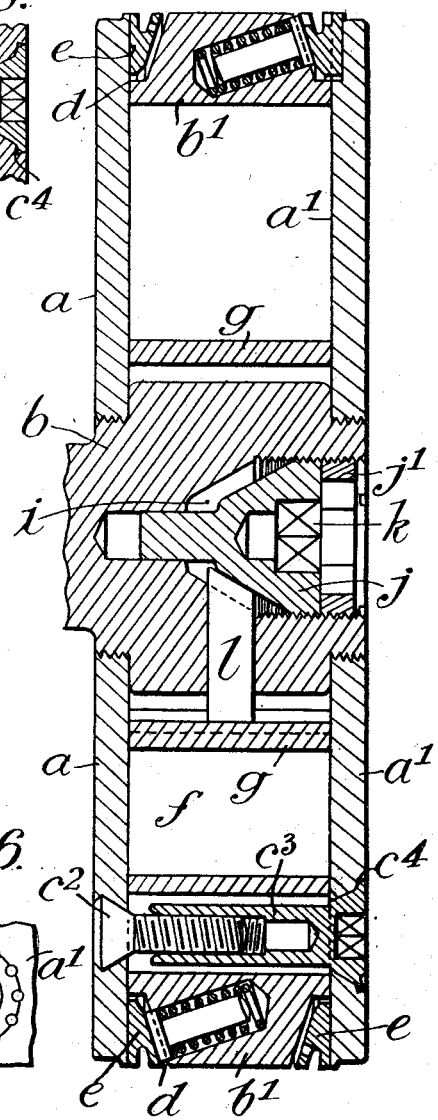
Figure 6:
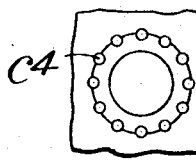
Figure 8:
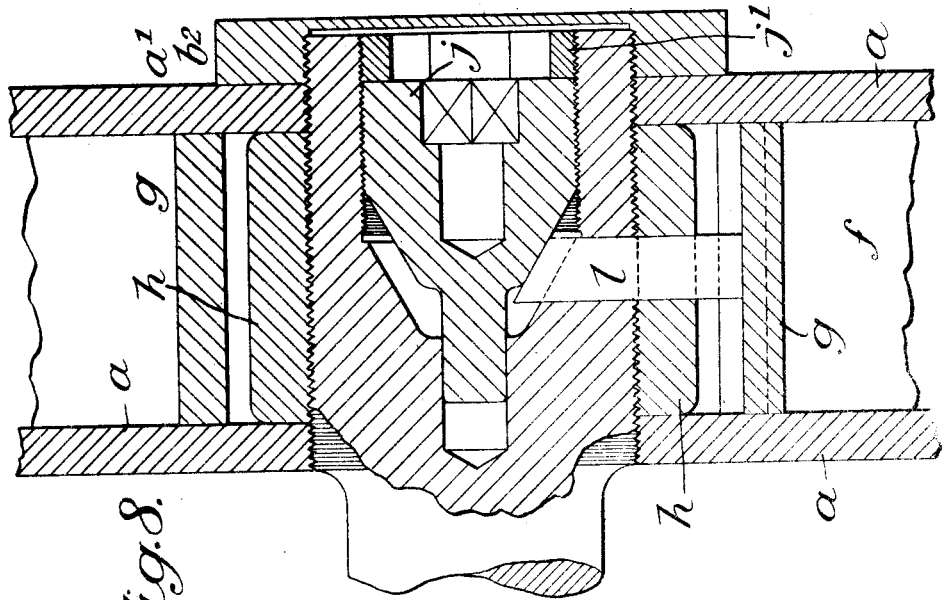
Figure 7:
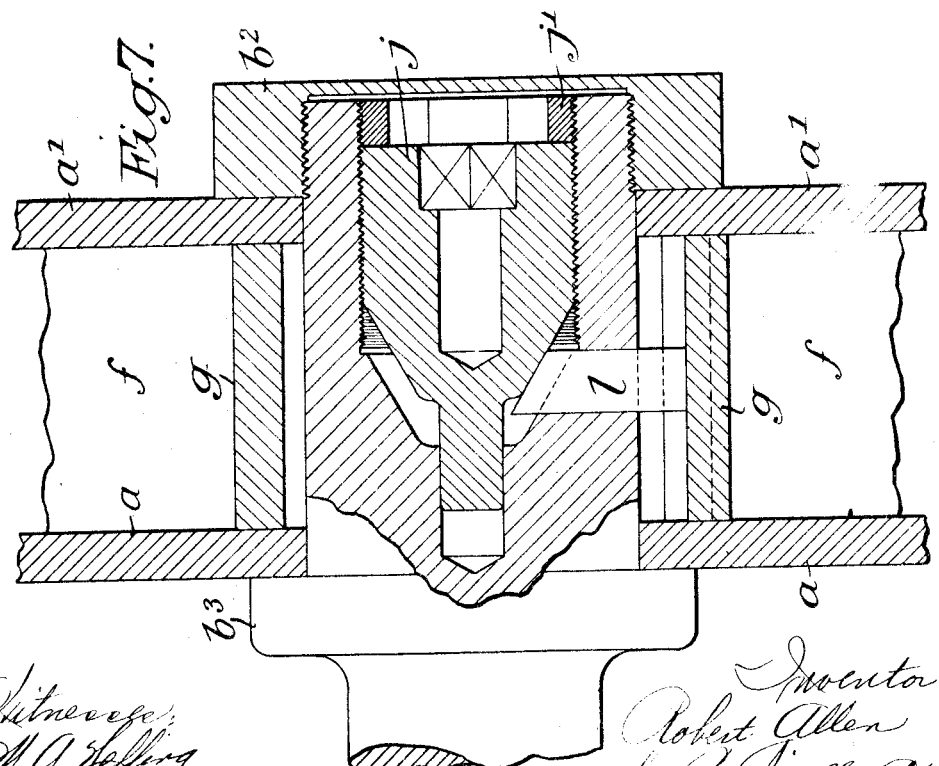

Figure 1 is an end elevation of a piston constructed according to this invention, one of the end plates being removed. Fig. 2 is a vertical section of the same. Figs. 3 and 4 are similar views to Figs. 1 and 2 illustrating a modified form of construction. Figs. 5 and 6 are detail views illustrating in section and end elevation respectively one end of a two part stud bolt, and its seating. Figs. 7 and 8 are sections through the ends of the piston rod and portions of the piston heads attached thereto, showing different ways of securing the parts of the head in position on the rod.

Referring to Figs. 1 and 2 the box section piston shown therein comprises end plates $a$ $a^1$ fixed against a boss or enlargement $b$ on the piston rod and a hollow main body portion or packing ring carrier $b^1$ which is adjustable in relation to the end plates $a$ $a^1$ and forms the centering ring. Bolts $c$ with countersunk heads and nuts are employed to secure the end plates together and to fix them firmly against the body $b^1$ and boss $b$ on the rod, the heads of the bolts being locked by pins $c^1$ or other means. The centering ring $b^1$ is formed with seating grooves or recesses $d$ for the packing rings $e$ which are spring expanded rings of the pressure balanced type, and is connected by radial ribs $f$ with an inner ring or collar $g$ which surrounds the collar or boss $b$ on the piston rod, sufficient space or clearance being left between the boss $b$ and collar $g$ to admit of the transverse adjustment of one relatively to the other as hereinafter described.

Extending inward for a suitable distance from the outer end of the piston rod is a bored hole or recess $i$ intended to receive and guide the screw threaded adjusting plug $j$ which is made of conical form for a portion of its length and has an opening $k$ for the insertion of a key for the adjustment of the plug. Rods $l$, beveled at their inner ends bear against the plug $j$ and also against the collar $g$ of the centering ring, said rods being guided in radial holes in the piston rod. Where the collar $g$ is not employed the rods $l$ may be extended to act directly on the centering ring $b^1$. The outer end plate $a^1$ of the piston is bored centrally to enable the adjusting key to be inserted into the adjusting plug $j$ in the piston rod, this opening being as shown in Figs. 1 and 2 made smaller in diameter than the plug so that the plug cannot possibly work out while the end plate is in position.

To facilitate the assembly of the parts of the piston the inner end plate a when in position may be held by a screw stud m which screws into the boss or collar on the rod and engages a screw lug n on the end plate. This prevents the plate being pushed away when the other plate is being placed on the fixing bolts.

As shown in Figs. 3 and 4 the two end plates a a¹ of the built up piston head are screwed on opposite ends of a boss or enlargement b on the piston rod, and the centering ring b² is clamped between the end plates by two part stud bolts, each consisting of a screw threaded stud c and an internally screw threaded hollow stud or sleeve c² recessed in the head to fit a square adjusting key. In order to fix the stud bolts against rotation the countersunk seatings for the heads of the bolts are drilled with circular recesses c⁴ near the outer edges— Fig. 4—and a portion of the head of each bolt near the edge is forced by punching into one of the recesses as shown in Figs. 5 and 6. This punched-in portion can be easily bored out when it is desired to release the bolt.

By screwing in the plug j the rods i are caused to move downward and force the centering ring downward in relation to the end plates and rod to take up or compensate for the extra wear of the lower part of the piston due to the weight of the piston head. This can be readily effected after slackening the bolts c c² studs c², c², the plug j being finally locked by the lock ring j².

In the modified form of construction shown in Fig. 7 the end plates a a¹ instead of being screwed on the opposite ends of a boss are placed on the rod from the same end and secured in position by a screw cap b² which also incloses the adjusting plug j of the centering ring as well as the lock ring j². In this case one of the end plates bears against a collar b⁵ on the rod and the plates are spaced apart by the collar g and rim of the centering ring.

Fig. 8 illustrates a modified form of construction in which the end of the piston rod is screw threaded and the plates a a¹ are screwed on with a screw threaded distance collar h between them. This arrangement enables the end plate a of the piston head to be screwed on the rod before the collar is on.

In some constructions the end plates are divided into two parts diametrically and connected by screws when in position.

What I claim, and desire to secure by Letters Patent is:—

1. A piston construction comprising in combination a head, a centering ring for said head, and wedging means applied near the center of the piston head and arranged to adjust the ring eccentrically in the head.

2. The combination with a piston rod having a boss thereon of a hollow piston for said rod comprising an adjustable centering ring forming the main body of the piston, movable end plates fixed on opposite sides of said boss, and means for adjusting said rings eccentrically including a wedge arranged in a screw threaded opening in the end of the piston rod, and radially sliding rods interposed between the wedge and the centering ring.

3. The combination with a piston rod having a boss and having a screw threaded opening in the end thereof of a hollow piston for said rod comprising an adjustable centering ring forming the main body of the piston, movable end plates fixed on opposite sides of said boss, and means for adjusting said centering ring eccentrically including a wedge arranged in said screw threaded opening in the end of the piston rod and radially sliding rods interposed between the wedge and the centering ring, said centering ring having an inner collar, and having radial webs connecting the collar with the ring, said webs forming compression stays for the hollow piston.

4. The combination with a piston rod having a boss and having a threaded opening in the end thereof of a hollow piston for said rod comprising a head, an eccentrically adjustable centering ring forming the main body of the piston, movable end plates fixed on opposite sides of said boss, a wedge arranged in said screw threaded opening in the end of the piston rod, radially sliding rods interposed between said wedge and the centering ring, and a screw threaded cap for securing the head in position on the rod and which also incloses said wedge.

5. A piston construction comprising in combination a head, a centering ring for said head, and wedging means applied near the center of the piston head and arranged to move the centering ring and head in diametrically opposite directions to adjust the ring eccentrically in the head.

In testimony whereof I affix my signature, in presence of two witnesses.

ROBERT ALLEN.

Witnesses:
L. NASH,
SAMUEL PERCIVAL.